US011300680B2

(12) United States Patent
Cornell et al.

(10) Patent No.: US 11,300,680 B2
(45) Date of Patent: Apr. 12, 2022

(54) THREE-DIMENSIONAL (3D) RADAR WEATHER DATA RENDERING TECHNIQUES

(71) Applicant: Raytheon Company, Waltham, MA (US)

(72) Inventors: Mark A. Cornell, Omaha, NE (US); Rachel M. Phinney, Lincoln, NE (US); Nicole A. Haffke, La Vista, NE (US); John Elkins, Omaha, NE (US); Alan M. Lee, Lincoln, NE (US); Sabien D. Jarmin, Omaha, NE (US); Scott W. Nicholson, Omaha, NE (US)

(73) Assignee: Raytheon Company, Waltham, MA (US)

( * ) Notice: Subject to any disclaimer, the term of this patent is extended or adjusted under 35 U.S.C. 154(b) by 198 days.

(21) Appl. No.: 16/680,187

(22) Filed: Nov. 11, 2019

(65) Prior Publication Data
US 2020/0319335 A1 Oct. 8, 2020

Related U.S. Application Data

(60) Provisional application No. 62/827,991, filed on Apr. 2, 2019.

(51) Int. Cl.
*G01S 13/95* (2006.01)
*G06T 17/05* (2011.01)
(Continued)

(52) U.S. Cl.
CPC ............. *G01S 13/958* (2013.01); *G01S 7/04* (2013.01); *G01S 13/95* (2013.01); *G06T 15/83* (2013.01);
(Continued)

(58) Field of Classification Search
CPC .......... G01S 13/95; G01S 13/958; G01S 7/04; G06T 19/00; G06T 17/005; G06T 17/05; G06T 17/10; G06T 15/83; Y02A 90/10
See application file for complete search history.

(56) References Cited

U.S. PATENT DOCUMENTS

| 7,042,454 B1 * | 5/2006 | Seligman ................ G06T 15/00 345/428 |
| 2002/0109684 A1 * | 8/2002 | Repin .................... G06T 15/503 345/424 |

(Continued)

FOREIGN PATENT DOCUMENTS

| CN | 106097426 A | 11/2016 |
| CN | 109410313 | 3/2019 |
| WO | WO-2020206022 A1 | 10/2020 |

OTHER PUBLICATIONS

Peterka, Ivo. "3D Visualization of Meteorological Information." Bachler's Thesis Masarykova University, 2008. (Year: 2008).*
Lundblad, Patrik, Oskar Eurenius, and Tobias Heldring. "Interactive visualization of weather and ship data." 2009 13th International Conference Information Visualisation. IEEE, 2009. (Year: 2009).*

(Continued)

*Primary Examiner* — Daniel F Hajnik
(74) *Attorney, Agent, or Firm* — Schwegman Lundberg & Woessner, P.A.

(57) ABSTRACT

Disclosed in some examples are methods, systems, devices, and machine-readable media for 3D radar weather data rendering techniques. A computer-implemented method for 3D radar weather data rendering includes retrieving weather data from a weather radar. Gridded data is generated based on the weather data. The gridded data includes a uniform grid of cubes, where each of the cubes is associated with at least one weather parameter value of a plurality of weather parameter values corresponding to the weather data. A triangular mesh for a data grouping within the gridded data is extracted. An object file including vertices and faces associated with the triangular mesh is generated. The object
(Continued)

file is communicated to a three-dimensional (3D) visualization system to present a 3D rendering of the object file.

17 Claims, 11 Drawing Sheets

(51) Int. Cl.
    *G06T 17/00*     (2006.01)
    *G06T 15/83*     (2011.01)
    *G06T 17/10*     (2006.01)
    *G06T 19/00*     (2011.01)
    *G01S 7/04*     (2006.01)

(52) U.S. Cl.
    CPC ............ *G06T 17/005* (2013.01); *G06T 17/05* (2013.01); *G06T 17/10* (2013.01); *G06T 19/00* (2013.01); *Y02A 90/10* (2018.01)

(56) References Cited

U.S. PATENT DOCUMENTS

2008/0274752 A1* 11/2008 Houri ................ H04W 64/003
                                                                                          455/456.1
2020/0202737 A1* 6/2020 Aiyer ................ G06K 9/00671

OTHER PUBLICATIONS

Foley et al., "Computer Graphics: Principles and Practice", Addison Wesley, 2nd ed. in C, 1996, ISBN 0-201-84840-6, pp. 550-555. (Year: 1996).*
Akenine-Moller, Thomas and Eric Haines. "Real-Time Rendering." 2nd ed. (2002), pp. 70-73. (Year: 2002).*
"International Application Serial No. PCT US2020 026249, International Search Report dated Jul. 1, 2020", 5 pgs.
"International Application Serial No. PCT US2020 026249, Written Opinion dated Jul. 1, 2020", 7 pgs.
Aron, Ernvik, "3D Visualization of Weather Radar Data", [Online] Retrieved from the internet:http: www.di va-portal.org smash get diva2:17271 FULLTEXT01.pdf, (Jan. 1, 2002).
Yasushi, Fujiyoshi, "Three-Dimensional Display of Radar Echoes Using the Technique of Marching Cubes", Journal of Atmospheric and Oceanic Technology, vol. 8, No. 6,, (Dec. 1, 1991), 869-872.
Zhon-Ke, Wang, "Improved Marching Cubes algorithm for echo data of meteorology radar", Computer Engineering and Design, vol. 28, No. 17,, (Sep. 1, 2007), 4323-4325.
Zhongneng, Liu, "Using MC Algorithm to Implement 3D Image Reconstruction for Yunnan Weather Radar Data", Journal of Computer and Communications, vol. 05, No. 05,, (Mar. 30, 2017), 50-61.
"International Application Serial No. PCT/US2020/026249, International Preliminary Report on Patentability dated Oct. 14, 2021", 9 pgs.

* cited by examiner

THREE-DIMENSIONAL (3D) RADAR WEATHER DATA RENDERING TECHNIQUES

CROSS-REFERENCE TO RELATED APPLICATION

This patent application claims the benefit of U.S. Provisional Patent Application No. 62/827,991, filed Apr. 2, 2019, entitled "3D RADAR WEATHER RENDERING TECHNIQUES", which is incorporated by reference herein in its entirety.

TECHNICAL FIELD

Some embodiments relate to radar weather data rendering techniques. More specifically, some embodiments relate to three-dimensional (3D) radar weather data rendering techniques. Some embodiments relate to the generation of bookmarks using two-dimensional (2D) rendered data and using such bookmarks for the 3D radar weather data rendering.

BACKGROUND

People responsible for weather prediction and monitoring may have a difficult time visualizing and interpreting the weather data due to the large volume and complexity associated with weather data. Additionally, the volume of weather data continues to increase. People responsible for weather prediction and monitoring may have a difficult time determining whether there is a weather alert due to a large amount of weather data.

BRIEF DESCRIPTION OF THE DRAWINGS

The present disclosure is illustrated by way of example and not limitation in the figures of the accompanying drawings, in which like references indicate similar elements and in which.

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in or substituted for, those of other embodiments. Embodiments set forth in the claims encompass all available equivalents of those claims.

In some aspects, advanced processing and visualization of X-Band radar data can be performed using one or more of the techniques discussed herein to fully realize the benefits of the higher spatial and temporal resolution such radar data provides. Three-dimensional visualization techniques discussed herein allow for 3D radar weather data visualization that more accurately mirrors physical reality and weather forecasters will be able to make more informed predictions. Additionally, meteorologists will be able to more quickly identify structures and patterns in the 3D data visualization that they may have otherwise missed in a limited two-dimensional view.

In some aspects, a weather forecaster can receive and display radar weather data (e.g., by displaying a 2D object of the radar weather data) using a user interface on a computing device, create a bookmark of a desired geographical area (e.g., a possible severe weather area), and open the requested weather data in a 3D DWR visualization hardware to view a 3D rendering of the requested weather data. Techniques disclosed herein can be used to pre-process radar weather data using an octree data structure to grid the data (e.g., by generating a uniform grid of cubes where each vertex of a cube has an associated weather parameter value (e.g., a reflectivity value) or another radar data product value). The gridded data may be processed by a marching cubes algorithm (or another technique) to generate surface data corresponding to the radar weather data (e.g., by extracting a triangular mesh using the gridded data). The surface data, which can include vertices and faces, is used to generate a 3D object (e.g., in the form of an object file), which can be communicated to a 3D visualization hardware for rendering. In this regard, 3D radar weather data visualization techniques disclosed herein can enable users of the system to more easily analyze weather-related aspects for a selected geographical area.

Figure 1:
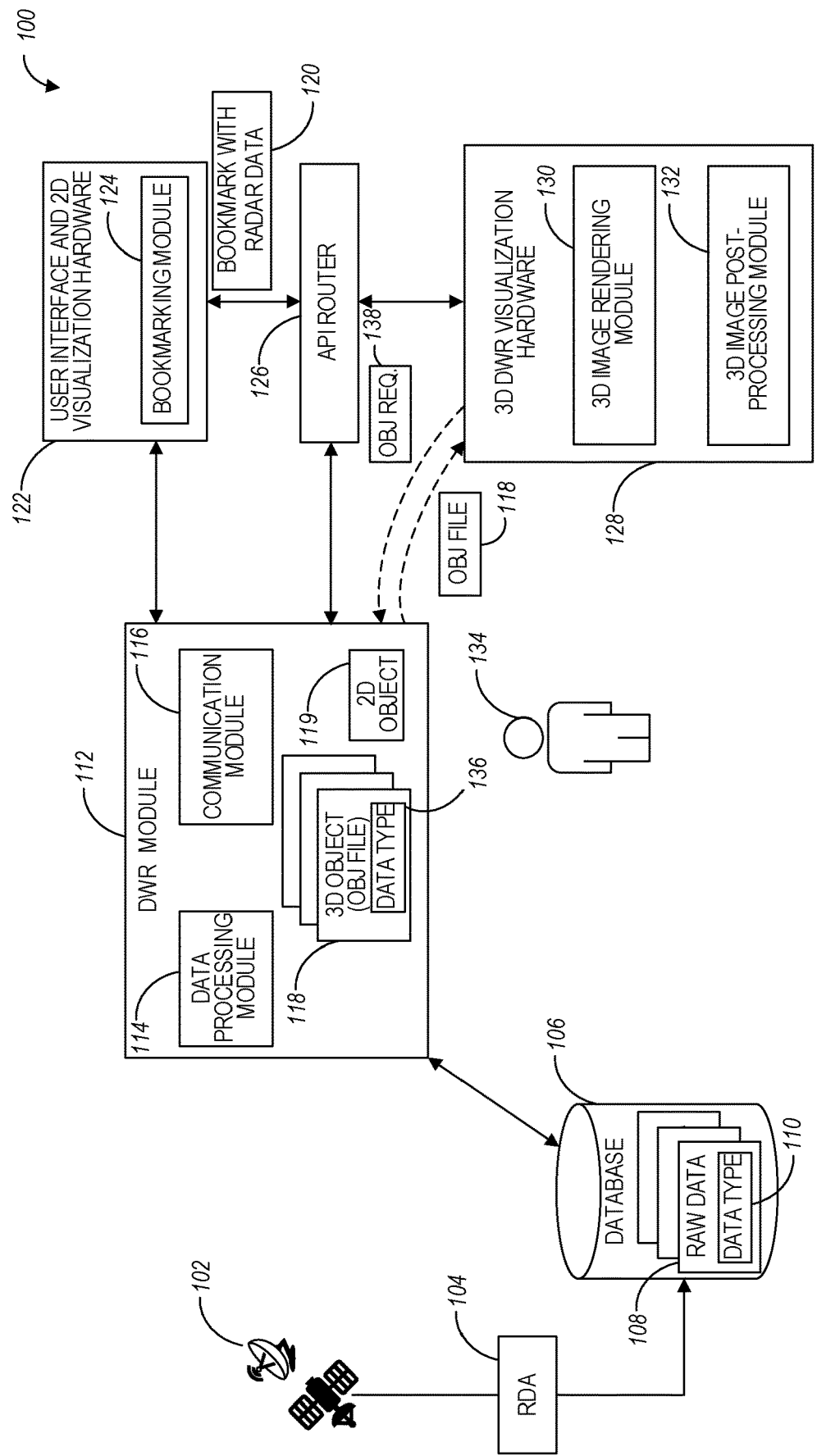
FIG. 1 illustrates a system for 3D Doppler weather radar (DWR) visualization, in accordance with some embodiments.

FIG. 1 illustrates a system for 3D DWR visualization 100 in accordance with some embodiments. Illustrated in FIG. 1 is radars 102, radar data acquisition (RDA) 104, database 106, a DWR module 112, user interface (U/I) and two-dimensional (2D) visualization hardware 122, an application programming interface (API) router 126, and a 3D DWR visualization hardware 128. The DWR module 112 includes a data processing module 114 and a communication module 116. The U/I and 2D visualization hardware 122 includes a bookmarking module 124. The 3D DWR visualization hardware 128 includes a 3D image rendering module 130 and a 3D image post-processing module 132.

In some embodiments, the system for 3D DWR visualization 100 complies with Federal Aviation Administration (FAA) standards or regulations, and/or National Oceanic and Atmospheric Administration (NOAA) standards or regulations. The system for AR-DWR visualization 100 may utilize an application program interface (API) of an Advanced Weather Interactive Processing System (AWIPS®)/JET® application.

The radars 102 may be Spectrum Efficient National Surveillance Radar (SENSR), Doppler weather radar (DWR), legacy next generation radar (NEXRAD), Terminal Doppler Weather Radar (TDWR), Raytheon® Skyler™, X-Band Low Power Radar (LPR), satellites, ground-based radar, X-band radar (e.g., 30 seconds to do a full volume), or another type of radar.

The RDA 104 processes the data from the radars 102 and stores the data in the database 106 as raw data 108. The raw data 108 may also include radar weather data used for generating 2D and 3D objects as discussed herein. The raw data 108 is processed by the data processing module 114 in the DWR module 112 to generate 3D objects 118 and 2D objects 119. Alternatively, the raw data 108 can also be processed by the U/I and 2D visualization hardware 122 for purposes of generating the 2D object 119 and a 2D rendering of the 2D object. The communication module 116 interacts with the U/I and 2D visualization hardware 122 as well as with the 3D DWR visualization hardware 128 via the API router 126.

The RDA 104 may be hosted by a computer, which may be on the same computer as the DWR module 112 and database 106 or a different computer. The RDA 104 may reside over a computer network from the database 106 and/or the DWR module 112.

The database 106 may be electronic storage for the raw data 108 from the radars 102. The database 106 may reside over a computer network from the RDA 104 and/or the DWR module 112. In some aspects, the raw data 108 may have one or more data types 110. The data type 110 may be indicative of a weather parameter, such as reflectivity (e.g., composite reflectivity), wind velocity (e.g., storm relative velocity, radial velocity), temperature, etc. In some aspects, the database 106 may store the raw data 108 in a geographical hash storage system that enables quick access to the raw data 108.

The DWR module 112 may be part of the Advanced Weather Interactive Processing System (AWIPS®), Environmental Data Exchange (EDEX™), and/or uFrame™. The data processing module 114 may comprise suitable circuitry, interfaces, and/or code and is configured to generate 3D objects 118 and 2D objects 119 using radar weather data stored in the database 106. The 3D objects 118 (as well as the 2D objects 119) may include a data type 136. Data type 136 may be indicative of a weather parameter, such as reflectivity, wind velocity, temperature, and so forth. The data type 136 may be termed metadata because it is derived from the raw data 108.

In some aspects, the 3D objects 118 generated by the data processing module 114 (e.g., using one or more of the techniques discussed herein) may be an object file including vertices and faces of objects generated based on radar weather data, which object file can be rendered in 3D by the 3D DWR visualization hardware 128. Without the construction of vertices and faces for the 3D objects 118, the raw data 108 is information about individual radar points, e.g., x, y, and z coordinates with product information associated with such radar points, including one or more weather parameters, such as wind velocity, reflectivity, temperature, etc.

The communication module 116 may respond to interactions (e.g., requests) from the user 134 and/or the 3D DWR visualization hardware 128. An example interaction may be a request by the user 134 to view a 2D rendering of weather data via the U/I and 2D visualization hardware 122. Another example interaction may be a selection of an area (e.g., creating a bookmark 120 via the bookmarking module 124) for 3D viewing via the 3D DWR visualization hardware 128. In this case, the 3D DWR visualization hardware 128 may request the generation of a 3D object (e.g., 3D object 118) by communicating a request via the API router 126 and the communication module 116.

The U/I and 2D visualization hardware may include a bookmarking module 124, which may include suitable circuitry, interfaces, and/or code and is configured to generate one or more bookmarks (e.g., bookmark 120) of an area of interest for viewing in a 2D rendering or viewing in a 3D rendering using the 3D DWR visualization hardware 128.

The 3D DWR visualization hardware 128 includes a 3D image rendering module 130 and a 3D image post-processing module 132. The 3D image rendering module 130 may include suitable circuitry, interfaces, and/or code and is configured to render a 3D image, such as a 3D object or 3D point data, based on an object file corresponding to a selected bookmark with radar weather data. In some embodiments, the 3D image rendering module 130 may include or be in communication with Microsoft HoloLens®. In this regard, the U/I and 2D visualization hardware 122 or the DWR module 112 may make calls to APIs of an augmented reality application, e.g., Microsoft HoloLens®, in connection with 3D visualization of radar weather data. The 3D image post-processing module 132 includes suitable circuitry, interfaces, and/or code and is configured to perform image augmentation on a 3D image rendering by applying lighting effects such as shading or other types of post-processing techniques.

The user 134 may be one or more people (e.g., forecaster, weather presenter, home user, etc.) that are using the system for 3D DWR visualization to view a 3D rendering of radar weather data.

In some embodiments, the functionality described in connection with FIG. 1 may be organized or distributed differently. For example, the functionality described in conjunction with RDA 104, DWR module 112, U/I and 2D visualization hardware 122, API router 126, and 3D DWR visualization hardware 128 may be distributed differently. In some embodiments the processing may be distributed. For example, RDA 104 may be on a server across a network, data processing module 114 may be on another server across a network, and 3D DWR visualization hardware 128 may be on another server across a network. Even though the DWR module 112, the U/I and 2D visualization hardware 122, the API router 126, and the 3D DWR visualization hardware 128 are illustrated as being separate entities in FIG. 1, the disclosure is not limited in this regard. More specifically, in an example embodiment, the DWR module 112, the U/I and 2D visualization hardware 122, the API router 126, and/or the 3D DWR visualization hardware 128 can be co-located (or integrated) as part of a single computing device.

In an example operation cycle of the system for AR-DWR visualization 100, the U/I and 2D visualization hardware 122 can be used by forecasters to visualize weather data on a computing device. A user 134 requests radar weather data visualization via the U/I and 2D visualization hardware 122. Based on the request, the DWR module 112 creates a 2D object 119 of radar weather data received from the database 106 and renders the 2D object for viewing by the user 134 using the U/I and 2D visualization hardware 122. The user 134 can use the bookmarking module 124 to generate a bookmark 120 of a desired area of interest for 3D visualization. An example bookmark creation is illustrated in connection with FIG. 2. In an example embodiment, the bookmark 120, which includes radar data such as latitude, longitude, height, weather parameter data such as reflectivity data (or other radar product data) and a color map, is communicated to the DWR module 112 as well as to the 3D DWR visualization hardware 128 via the API router 126.

Figure 5:
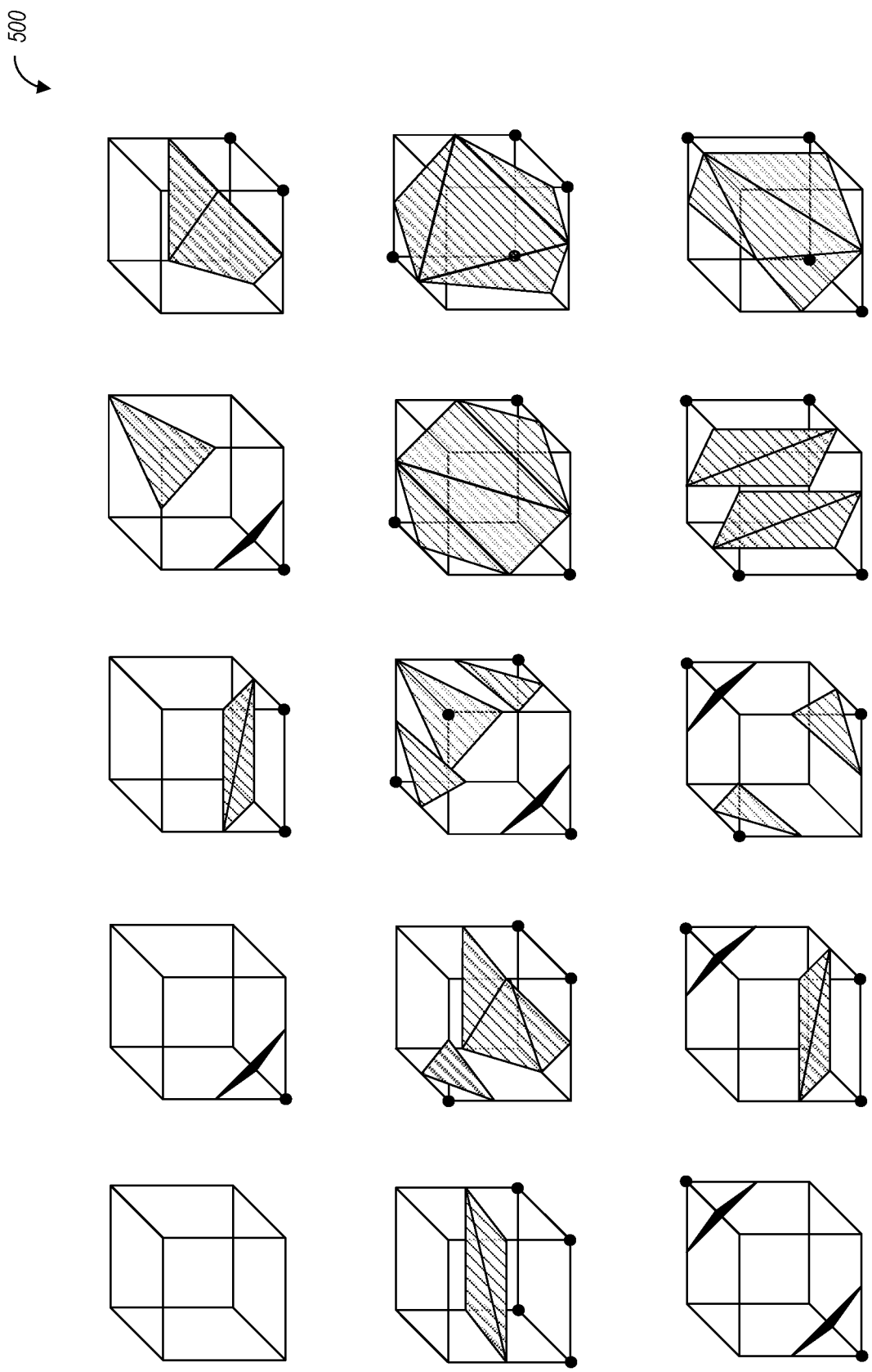
FIG. 5 illustrates different cube configurations for a marching cube algorithm in connection with 3D DWR visualization in accordance with some embodiments.
Figure 6A:
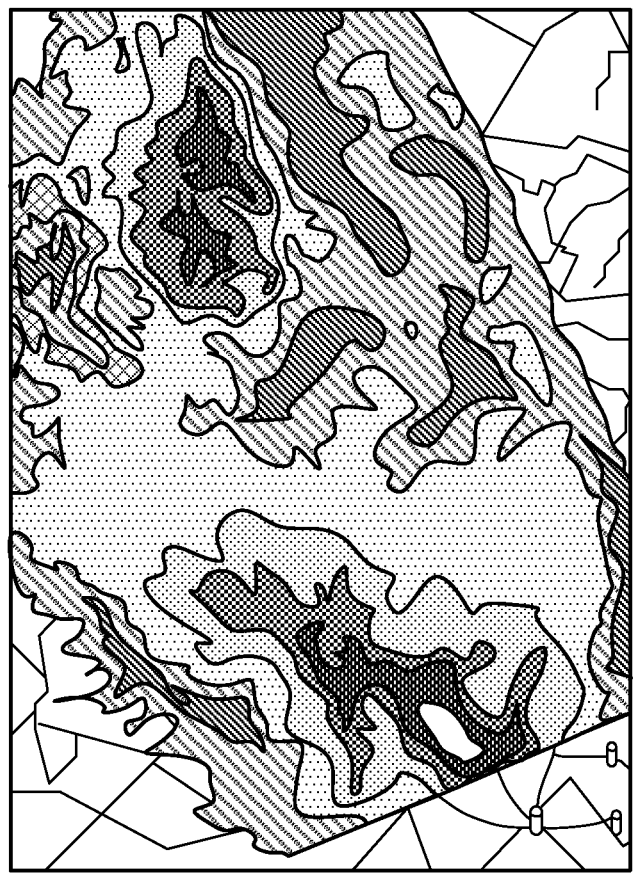
FIG. 6A and FIG. 6B illustrate different types of 3D DWR visualizations in accordance with some embodiments.
Figure 6B:
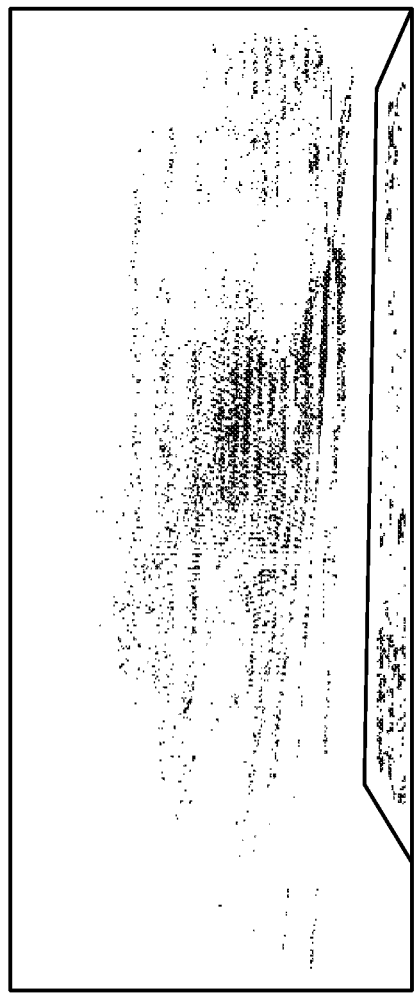

The 3D DWR visualization hardware 128, upon receiving the bookmark 120, communicates an object request 138 to the DWR module 112 via the API router 126 and the communication module 116. The data processing module 114 uses the radar weather data within the bookmark 120 to generate a 3D object 118 (e.g., in the form of an object file) and communicate the object file to the 3D DWR visualization hardware 128 for 3D image rendering, in response to the object request 138. Additional details regarding the data processing module 114 and the generation of the 3D object 118 are discussed in connection with FIG. 3, FIG. 4, and FIG. 5. Example 3D objects are illustrated in FIG. 6A and FIG. 6B. The 3D image rendering module 130 can perform 3D visualization of the received 3D object 118. In some embodiments, the 3D image post-processing module 132 performs image enhancements on the rendered 3D image (example 3D image enhancements are illustrated in connection with FIG. 7A and FIG. 7B). Creating a 3D radar weather data visualization using the techniques disclosed herein allows weather forecasters to take a deeper dive into the data, which will contribute to the overall goal of decreasing the time that forecasters need to detect life-threatening events such as tornadoes and issue a warning.

Figure 2:
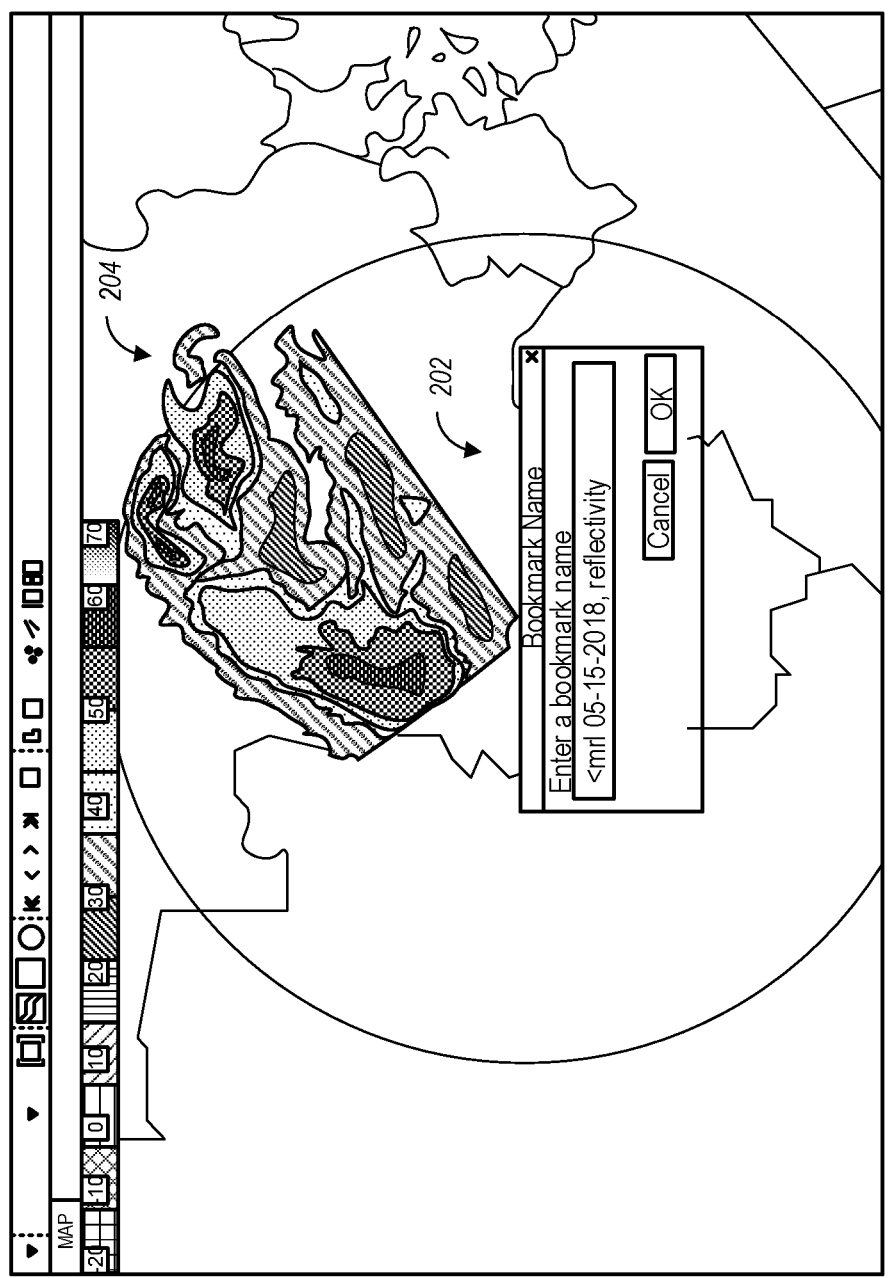
FIG. 2 illustrates an example user interface for generating a bookmark with radar data, which can be used in connection with 3D DWR visualization in accordance with some embodiments.

FIG. 2 illustrates an example user interface 200 for generating a bookmark (e.g., 120) with radar data 204, which can be used in connection with 3D DWR visualization in accordance with some embodiments. Referring to FIG. 2, user 134 can use interface 200 to view radar data 204 via the U/I and 2D visualization hardware 122. The user can invoke (e.g., by right-clicking a computer mouse or using another dedicated command) a bookmark menu 202 (as illustrated in FIG. 2) to enter a bookmark name and save the bookmark 120 for purposes of 3D viewing.

Bookmarking currently viewed radar data allow the user to send the current view (determined by a geographical bounding box), multiple products, and their corresponding colormaps to the 3D DWR visualization hardware 128 as well as the DWR module 112 and trigger 3D visualization of the bookmarked data. This allows the 3D DWR visualization hardware 128 to pull open the same data that is made available to the DWR module 112 in a seamless interaction. The created bookmark 120 can be stored within the DWR module 112, the 3D DWR visualization hardware 128, and/or the database 106.

In some embodiments, a bookmark 120 can be configured to also save a geographical bounding box, based on the view currently displayed by the user interface 200. Additionally, radar data products that are currently displayed and their corresponding color maps can also be attached to the bounding box and communicated with the bookmark 120. Consequently, when a user creates a bookmark, the user may send multiple data types, as well as the associated radar data, to the 3D DWR visualization hardware 128 and the DWR module 112 so that the 3D image rendering module 130 can properly request all of the necessary data for rendering (e.g., via the object request 138).

As mentioned above, the bounding box of the area of interest is stored as a bookmark. In other words, bookmarks are just storing the necessary index metadata in order to lookup the radar data, and bookmarks are not storing the radar data itself. As radar data comes in, such data is stored (e.g., in database 106) by radar and time. To retrieve the radar data for visualization, the bookmark can be used to query the correct data from the database 106. Example queries include the following: filtering a volume by a bounding box, filtering time intervals, filtering by data type, and filtering by a range of data values. In summary, the bookmark is stored as a bounding box and then the radar points are retrieved based on the bounding box.

Figure 3:
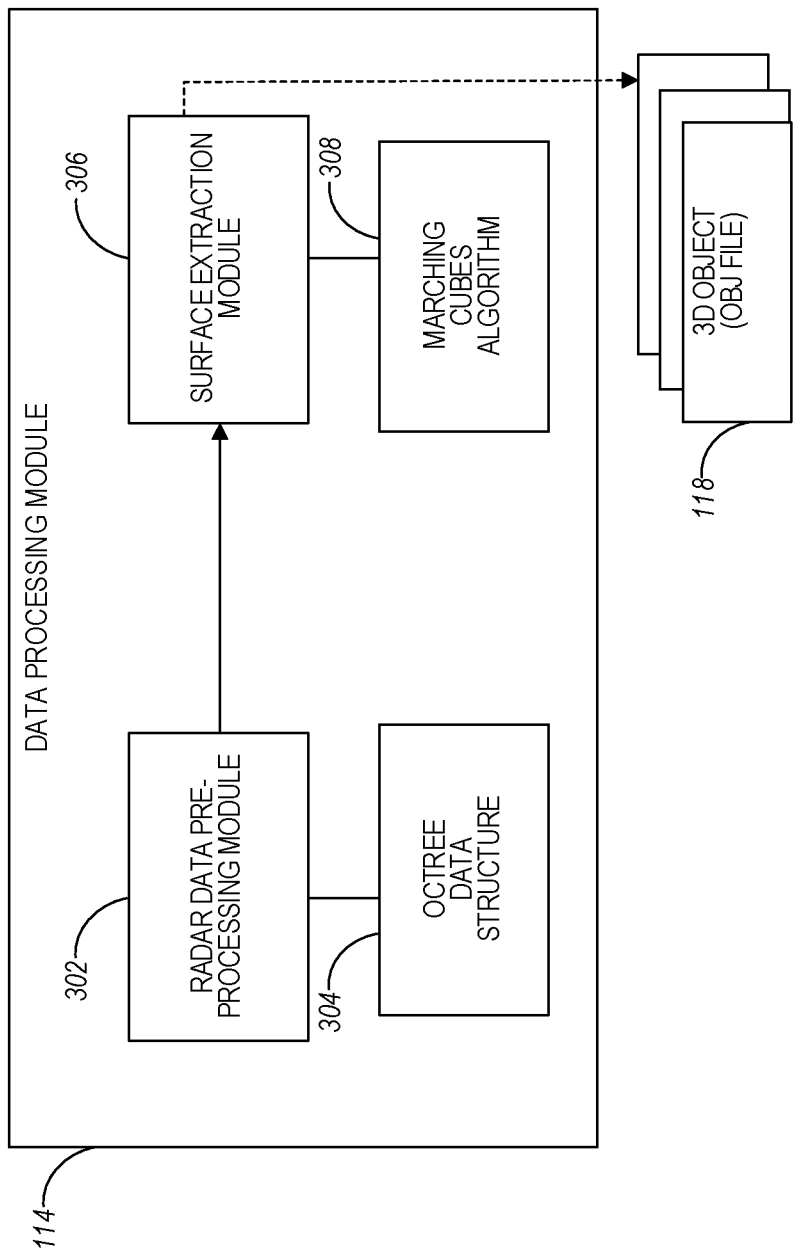
FIG. 3 illustrates a data processing module, which can be used in connection with 3D DWR visualization in accordance with some embodiments.

FIG. 3 illustrates a data processing module 114, which can be used in connection with 3D DWR visualization in accordance with some embodiments. Referring to FIG. 3, the data processing module 114 can include radar data pre-processing module 302 and a surface extraction module 306.

A method of data preprocessing is to use an octree data structure. Octrees partition three-dimensional space by recursively subdividing it into eight octants, up until a defined maximum depth is reached. Octrees are useful because they are an efficient means of sorting the data by their position, requiring the maximum depth number of decisions needed to sort the data. Typically, the ideal maximum depth is 8 because it divides the space into a high resolution without creating too many leaf nodes. Octrees naturally create a gridded space for marching cubes without needing to find an implicit surface function. This approach may be selected for the disclosed techniques because of its relatively easy implementation, its efficient sorting of data, and the potential to further refine the model to become more efficient.

Figure 4:
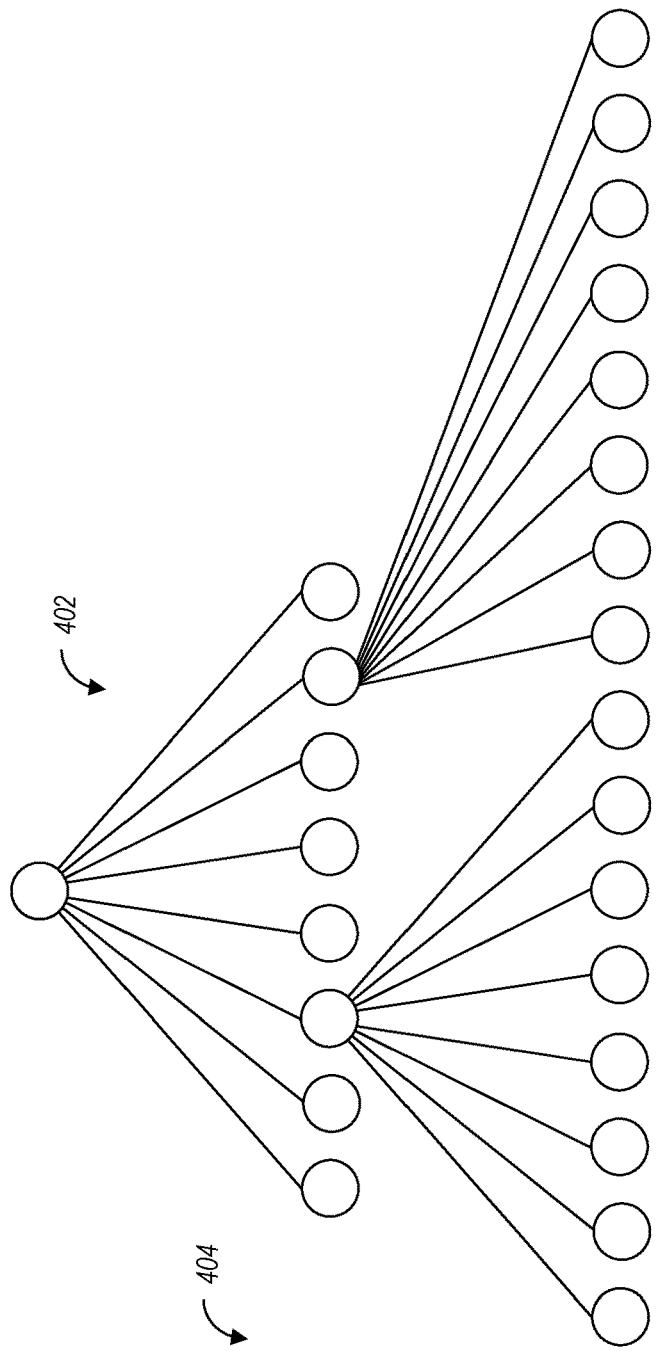
FIG. 4 illustrates an example octree data structure for gridding radar data in connection with 3D DWR visualization in accordance with some embodiments.
Figure 4:
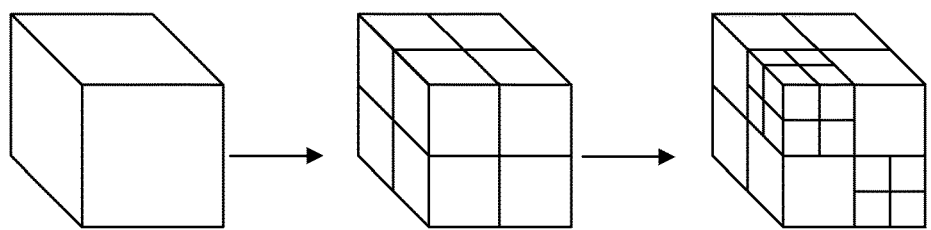

The radar data pre-processing module 302 may comprise suitable circuitry, interfaces, logic, and/or code and is configured to grid radar data prior to surface extraction by the surface extraction module 306. In some embodiments, pre-processing of the radar data can be performed using an octree data structure 304. FIG. 4 illustrates an example of an octree data structure 304 for gridding radar data in connection with 3D DWR visualization in accordance with some embodiments.

In operation, the radar data pre-processing module 302 receives radar data associated with the bookmark 120. In order to process the received radar data, each radar point is placed into an octree data structure 304. Octrees partition three-dimensional space by recursively subdividing it into eight octants. If no points are located in a leaf node, an "empty value" is assigned indicating no data is present. If only one point is located within a leaf node (e.g., one or more of the nodes 402), the weather parameter value (e.g., reflectivity value) of this point is used with no adjustments. If there are more than one data points in a leaf node, the weather parameter value is obtained through averaging. In some embodiments, the octree data structure may not be uniform and different branches of depth may be used, based on the density of the data at that location. In some embodiments, the process of averaging may be changed to using previously developed netting rules. The pre-processing performed by the pre-processing module 302 creates a uniform grid of cubes 404, where each vertex has an associated weather parameter value (e.g., a reflectivity value).

In some embodiment, geohash at constant heights may be used to grid the data in place of using an octree data structure. More specifically, geohashing uses a hierarchical data structure to subdivide space into buckets of grid shapes. In this regard, a geohash can be used to grid data by encoding a geographic location into a string of letters and/or digits.

The gridded data from the radar data pre-processing module 302 is communicated to the surface extraction module 306 for performing surface extraction. In some embodiments, the surface extraction module 306 uses a marching cubes algorithm 308 (or another surface extraction technique, such as the technique discussed in connection with FIG. 8) to perform the surface extraction. FIG. 5 illustrates different cube configurations 500 for a marching cubes algorithm in connection with 3D DWR visualization in accordance with some embodiments.

The marching cubes algorithm 308 is an example algorithm that can be used for surface reconstruction. In some aspects of the marching cubes algorithm, a data pre-processing approach is to create an implicit function F(x,y,z) such that F(x,y,z)=0 when on the surface. Using this generated function, the marching cubes algorithm can classify vertices of the cube as either inside or outside of the surface. However, most of the methods to generate an implicit surface function are costly and rely on having data that only represents the boundary of the surface. Moreover, the methods require having a normal estimate at each point. This condition is not satisfied with the radar data.

The marching cubes algorithm 308 works by processing the data into a uniform cubic grid. The algorithm finds the grid regions where the surface is determined to pass through and generates appropriate faces to approximate the surface. This algorithm is preferred because it generates high-resolution objects that accurately reflect the original data.

The gridded data is then grouped according to its data range. For each data grouping, the marching cubes algorithm 308 is used to extract a triangular mesh (as seen in FIG. 5). For each cube in a data grouping, the vertices are determined to be either inside or outside of the surface. The surface intersects the cube along the edges in between corners of different classifications. At each intersecting edge, the exact intersection point is estimated using linear interpolation.

Since each cube has 8 corners and each corner can either be inside or outside, there are 2^8=256 possible cases for each cube. However, these cases can be reduced to 14 unique cases (e.g., the cubes in FIG. 5, without the zero-data cube in the top-left corner of the figure) if you consider the fact that many are just rotations or mirrors of each other. Thus, each cube is given an appropriate index based on which of its vertices is located within the surface. If all the vertices are located in the surface, or none of the vertices are located in the surface, the surface does not pass through the cube and the marching cubes algorithm moves to the next cube. If the surface passes through the cube, the algorithm checks a preconstructed look-up table to create faces between the interpolated points created earlier. The vertices and faces associated with the extracted triangular meshes are stored as a 3D object 118 (e.g., as an object file).

FIG. 6A and FIG. 6B illustrate different types of 3D DWR visualizations in accordance with some embodiments. Referring to FIG. 6A, there is illustrated an example 3D rendering 600A of a 3D object, such as the 3D object 118 generated by the DWR module 112 based on the bookmark 120 and in response to the object request 138. The 3D rendering 600A is a 3D image that corresponds to a 2D image rendered by the U/I and 2D visualization hardware 122 at the time the bookmark 120 was created.

In some embodiments, the 3D image rendering module 130 can render 3D point data 600B, as illustrated in FIG. 6B, corresponding to the 3D object 118.

Figure 7B:
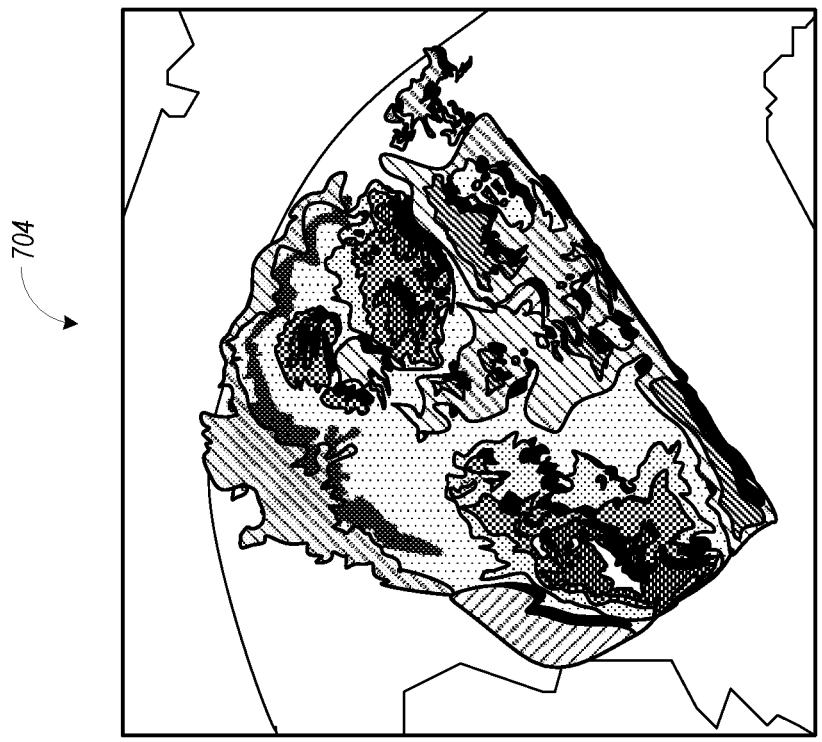
FIG. 7A and FIG. 7B illustrate post-processing techniques in connection with 3D DWR visualization in accordance with some embodiments.
Figure 7A:
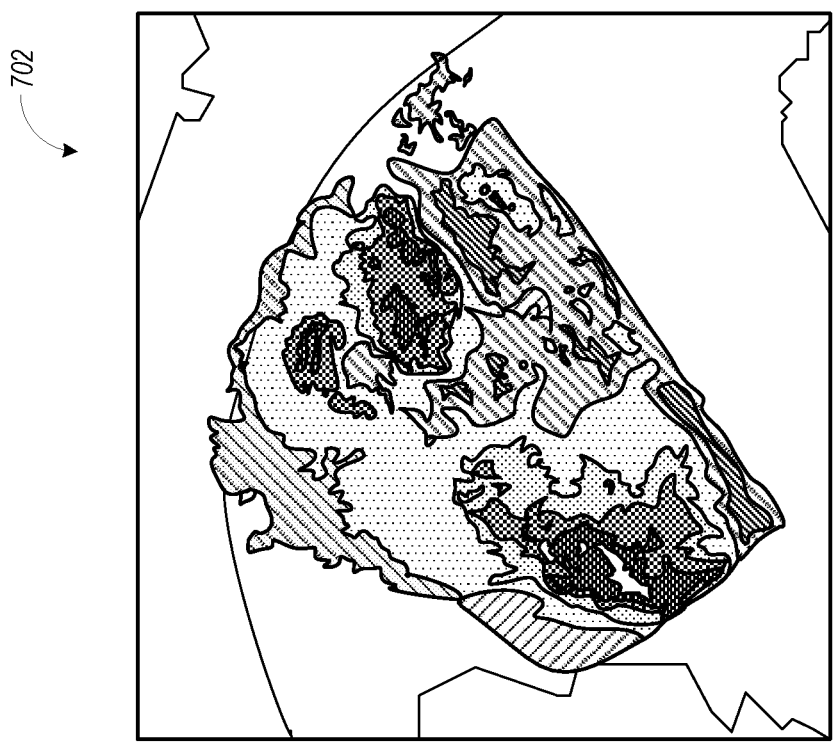

FIG. 7A and FIG. 7B illustrate post-processing techniques in connection with 3D DWR visualization in accordance with some embodiments. More specifically, FIG. 7A illustrates a 3D rendering 702 of a 3D object (e.g., 118) generated by the 3D image rendering module 130. In some embodiments, in order to simulate a real-world lighting effect as well as to further enhance the image quality, the 3D image post-processing module 132 can apply one or more enhancement techniques to adjust the 3D rendering 702 and generate an updated 3D rendering 704 illustrated in FIG. 7B.

For example, in order to simulate a real-world lighting effect, the 3D image post-processing module 132 can apply a Phong lighting model to the 3D rendering 702. This lighting model consists of three components: ambient, diffuse, and specular lighting. Ambient lighting serves as a background lighting that brightens all objects in the scene equally. Diffuse lighting simulates the directional impact of light on objects. The more part of an object faces the light source, the brighter it becomes. Finally, specular lighting simulates how objects partially reflect light. In some embodiments, specular lighting may not be used in connection with a shading model because it may distract from the appearance of the objects. In different embodiments, other lighting effects using shaders may also be used by the 3D image post-processing module 132.

In some embodiments, the lighting enhancements performed by the 3D image post-processing module 132 can be implemented in a fragment shader in OpenGL. Ambient lighting may be accomplished by multiplying the object color by, e.g., a constant between 0 and 1. The 3D objects may use an ambient value of 0.7. In order to increase the brightness of the objects, this value can be increased. Diffuse lighting may be calculated by multiplying the dot product of the fragment's norm and the direction of the light to the fragment by a constant between 0 and 1. In some embodiments, the 3D objects may use a diffuse value of 0.4. Increasing this value will result in a stronger color contrast within the object. In some embodiments, the 3D image post-processing module 132 may create shaders to enable the application to use dynamic color maps to color the object.

Figure 8:
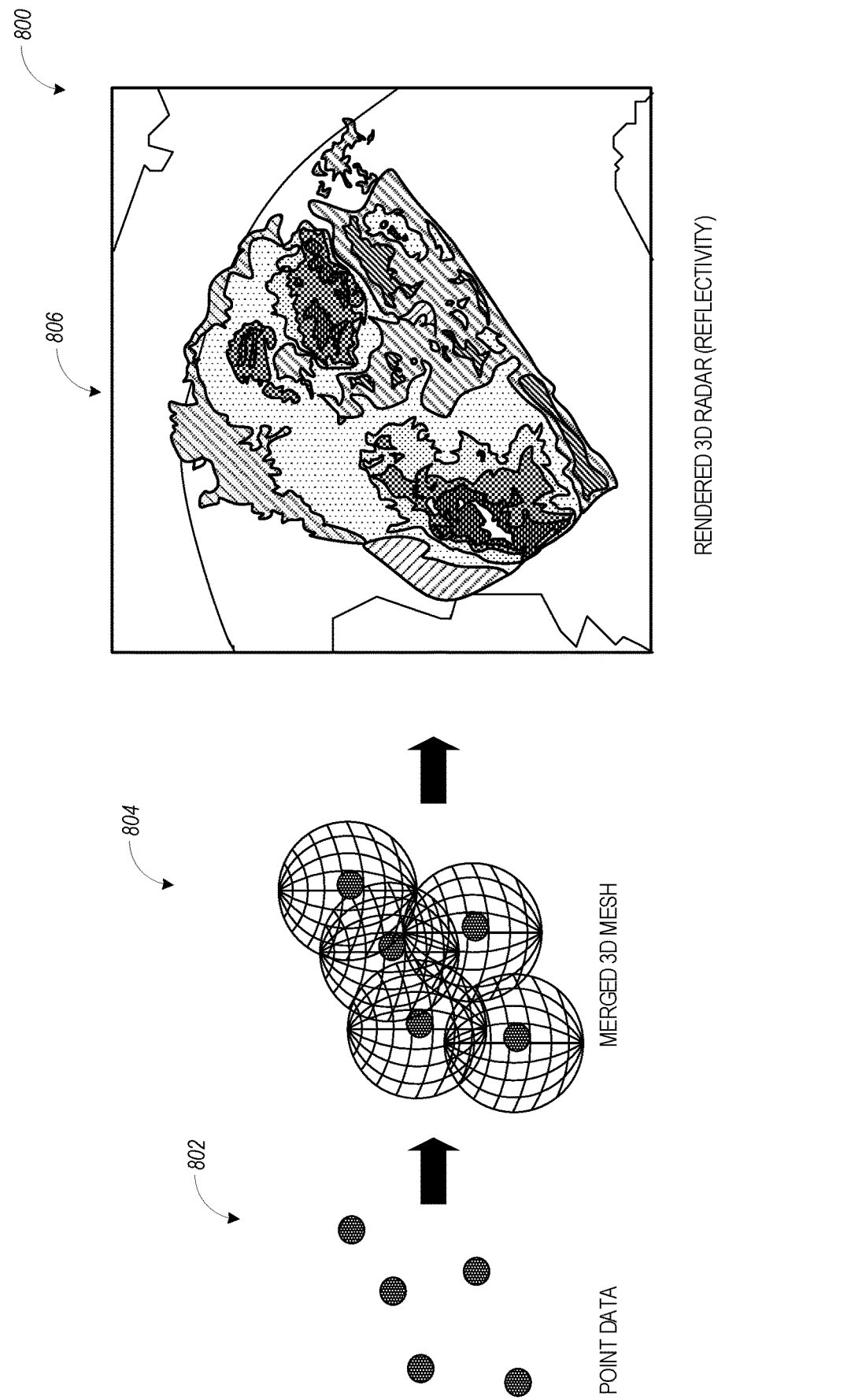
FIG. 8 illustrates another 3D DWR visualization technique using sphere mesh generation in accordance with some embodiments.

FIG. 8 illustrates another 3D DWR visualization technique 800 using sphere mesh generation in accordance with some embodiments. The 3D DWR visualization technique 800 may be performed by the data processing module 114 within the DWR module 112.

The data processing module 114 receives as inputs point radar data 802 via bookmark 120, including x, y, z coordinate data (e.g., latitude, longitude, and height) as well as product data (e.g., reflectivity, velocity, or other weather parameters) from the database 106. The point data 802 is split into ranges dependent on the product type that is being examined. For example, the data processing module 114 can be configured to process reflectivity (dBZ), velocity (m/s) data, or other weather parameter data.

For each data value range, a mesh object is created using PyMesh, a Python library. This tool is first used to create mesh spheres 804 for each data point by providing the PyMesh function with the x,y,z coordinate of each radar point to be used as the center of the sphere. All of the sphere meshes are then merged together and one object defined by faces and vertices is created as 3D object 806. PyMesh also offers several functions to refine the mesh such as removing duplicate vertices and faces. Since the vertices in the mesh are very dense, the refining process may be performed several times with different tolerance values used depending on the data range of the mesh. For example, reflectivity values that are lower are often on the outer edges of a storm system. In order to see the higher dBZ values located in the center of the storm, more vertices need to be removed from the lower dBZ range meshes. Finally, the vertices and faces for the mesh are written to an object (.obj) file representative of the 3D object 806. The .obj file also includes the corresponding material to use for the mesh. The materials are defined within the file and provide information regarding the color and transparency of each mesh.

Figure 9:
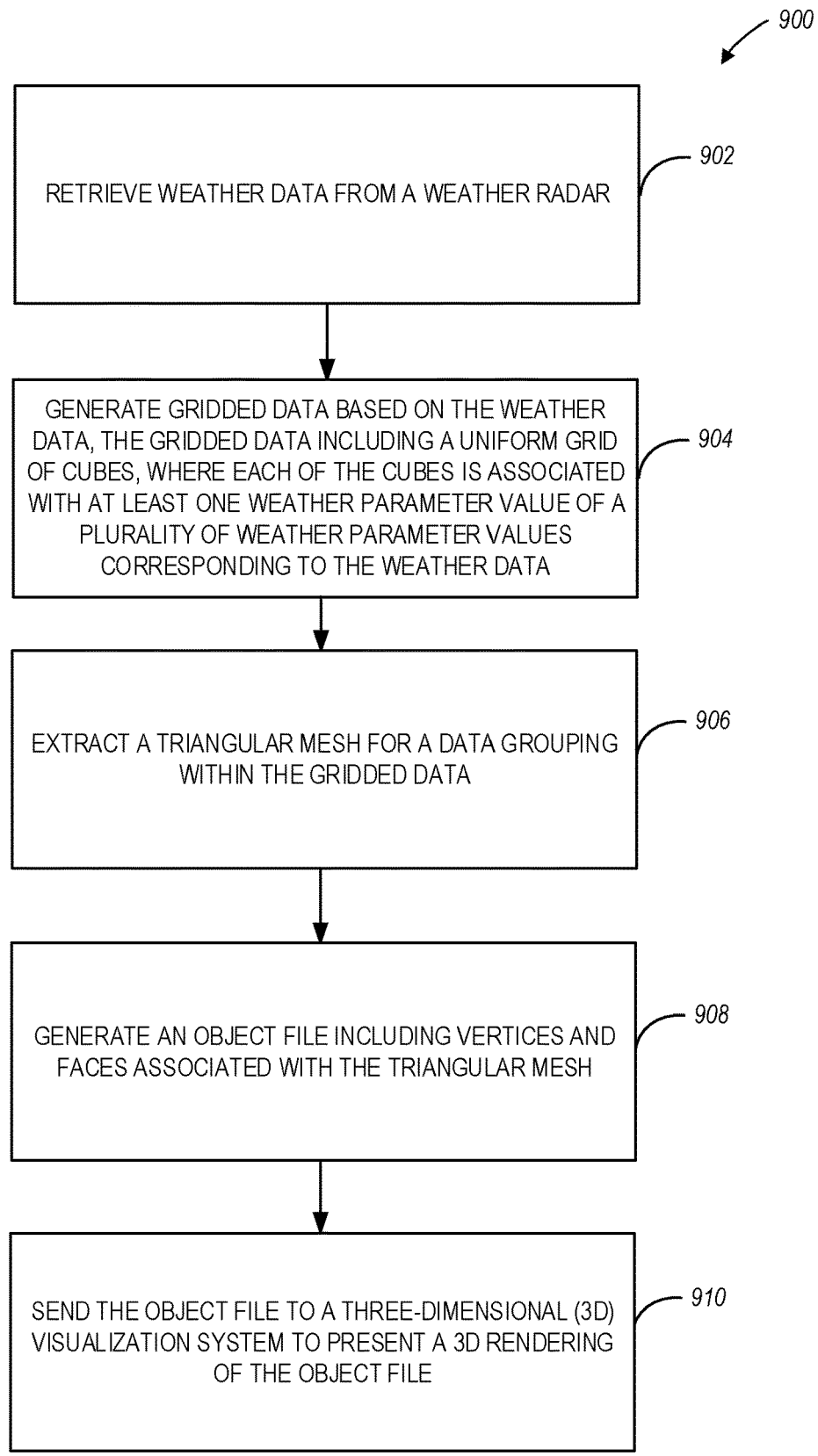
FIG. 9 illustrates a flowchart of a method for 3D DWR visualization in accordance with some embodiments.

FIG. 9 illustrates a flowchart of a method 900 for 3D DWR visualization in accordance with some embodiments. The method 900 includes operations 902-910, which can be performed by the DWR module 112. At operation 902, weather data is retrieved from weather radar. For example, DWR module 112 can retrieve radar weather data from bookmark 120 generated by the bookmarking module 124. The retrieving of the radar weather data can be in response to an object request 138 received from the 3D DWR visualization hardware 128. At operation 904, gridded data is generated based on the weather data. For example, the radar data pre-processing module 302 within the data processing module 114 can use an octree data structure to grid the radar data. The gridded data includes a uniform grid of cubes, where each of the cubes is associated with at least one weather parameter value (e.g., a reflectivity value) of a plurality of weather parameter values corresponding to the weather data. At operation 906, a triangular mesh is extracted for a data grouping within the gridded data. For example, the surface extraction module 306 within the data processing module 114 can apply the marching cubes algorithm 308 to the gridded data to extract the triangular mesh. At operation 908, an object file including vertices and faces associated with the triangular mesh is generated. At operation 910, the object file is communicated to a 3D visualization system, such as the 3D DWR visualization hardware 128, to present a 3D rendering of the object file (e.g., as illustrated in FIG. 6A and FIG. 6B).

Figure 10:
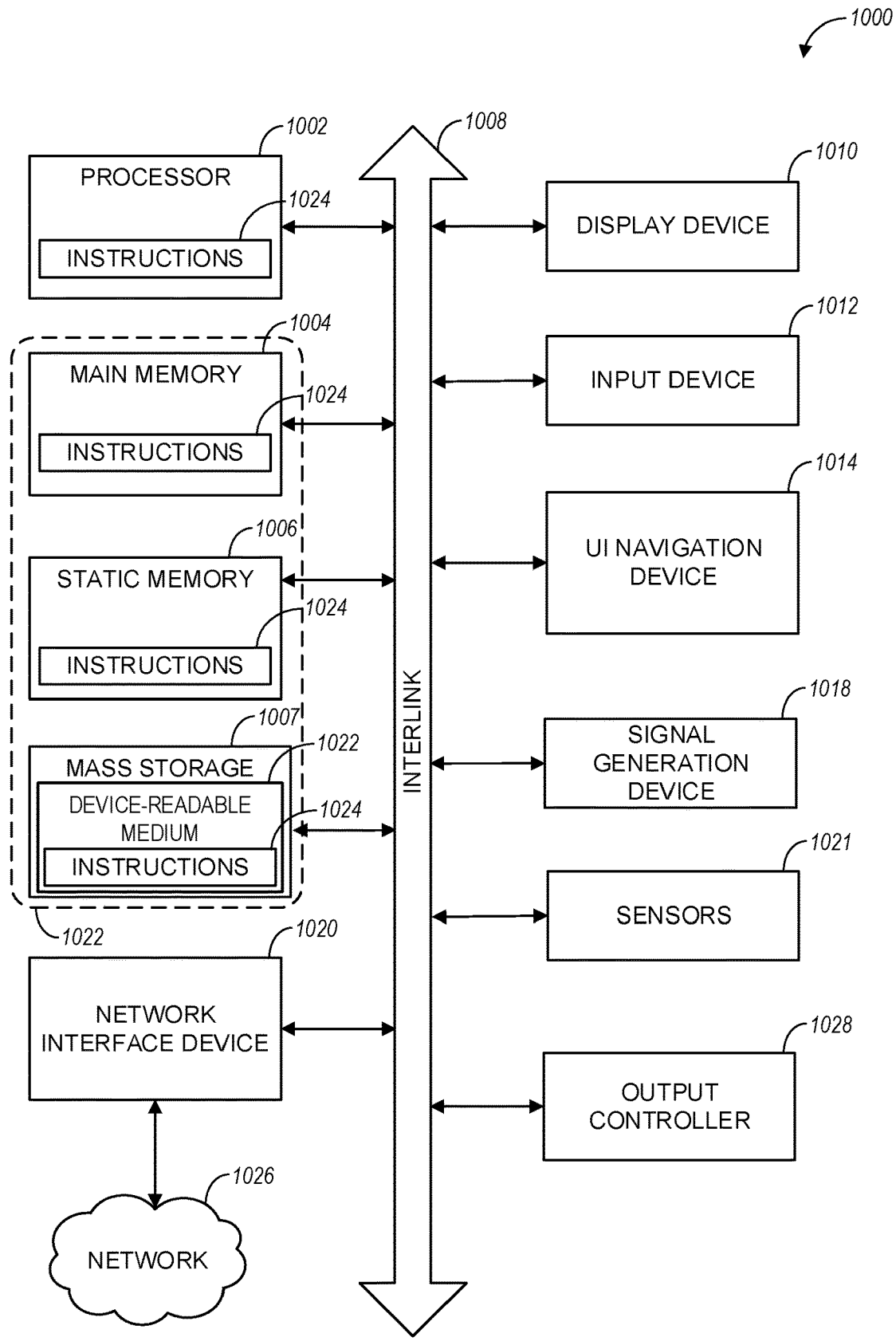
FIG. 10 illustrates a block diagram of an example machine upon which any one or more of the techniques (e.g., methodologies) discussed herein may be performed.

FIG. 10 illustrates a block diagram of an example machine 1000 upon which any one or more of the techniques (e.g., methodologies) discussed herein may be performed. In alternative embodiments, the machine 1000 may operate as a standalone device or may be connected (e.g., networked) to other machines. In a networked deployment, the machine 1000 may operate in the capacity of a server machine, a client machine, or both in server-client network environments. In an example, the machine 1000 may act as a peer machine in peer-to-peer (P2P) (or other distributed) network environment. The machine 1000 may be a server, personal computer (PC), a tablet PC, a set-top box (STB), a personal digital assistant (PDA), a portable communications device, AR hardware, a mobile telephone, a smartphone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Circuitry (e.g., processing circuitry) is a collection of circuits implemented in tangible entities of the machine 1000 that include hardware (e.g., simple circuits, gates, logic, etc.). Circuitry membership may be flexible over time. Circuitries include members that may, alone or in combination, perform specified operations when operating. In an example, the hardware of the circuitry may be immutably designed to carry out a specific operation (e.g., hardwired). In an example, the hardware of the circuitry may include variably connected physical components (e.g., execution units, transistors, simple circuits, etc.) including a machine-readable medium physically modified (e.g., magnetically, electrically, moveable placement of invariant massed particles, etc.) to encode instructions of the specific operation.

In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the device 1000 follow.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a communication device-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using the software, the general-purpose hardware processor may be configured as respective different modules at different times. The software may accordingly configure a hardware processor, for example, to constitute a particular module at one instance of time and to constitute a different module at a different instance of time.

Machine 1000 may include a hardware processor 1002 (e.g., a central processing unit (CPU), a graphics processing unit (GPU), a hardware processor core, or any combination thereof), a main memory 1004, a static memory 1006, and mass storage 1007 (e.g., hard drive, tape drive, flash storage, or other block or storage devices), some or all of which may communicate with each other via an interlink (e.g., bus) 1008.

Machine 1000 may further include a display device 1010, an alphanumeric input device 1012 (e.g., a keyboard), and a user interface (UI) navigation device 1014 (e.g., a mouse). In an example, the display device 1010, input device 1012 and UI navigation device 1014 may be a touchscreen display or include a Hololens Augmented Reality viewer. Machine 1000 may additionally include a signal generation device 1018 (e.g., a speaker), a network interface device 1020, and one or more sensors 1021, such as a global positioning system (GPS) sensor, compass, accelerometer, a radar, or another sensor. Machine 1000 may include an output controller 1028, such as a serial (e.g., universal serial bus (USB), parallel, or other wired or wireless (e.g., infrared (IR), near field communication (NFC), etc.) connection to communicate or control one or more peripheral devices (e.g., a printer, card reader, augmented reality devices, etc.).

The mass storage 1007 may include a communication device-readable medium 1022, on which is stored one or more sets of data structures or instructions 1024 (e.g., software) embodying or utilized by any one or more of the techniques or functions described herein. In some aspects, registers of the processor 1002, the main memory 1004, the static memory 1006, and/or the mass storage 1007 may be, or include (completely or at least partially), the device-readable medium 1022, on which is stored the one or more sets of data structures or instructions 1024, embodying or utilized by any one or more of the techniques or functions described herein. In an example, one or any combination of the hardware processor 1002, the main memory 1004, the static memory 1006, or the mass storage 1007 may constitute the device-readable medium 1022.

As used herein, the term "device-readable medium" is interchangeable with "computer-readable medium" or "machine-readable medium". While the communication device-readable medium 1022 is illustrated as a single medium, the term "communication device-readable medium" may include a single medium or multiple media (e.g., a centralized or distributed database, and/or associated caches and servers) configured to store the one or more instructions 1024. The term "communication device-readable medium" is inclusive of the terms "machine-readable medium" or "computer-readable medium", and may include any medium that is capable of storing, encoding, or carrying instructions (e.g., instructions 1024) for execution by the machine 1000 and that cause the machine 1000 to perform any one or more of the techniques of the present disclosure, or that is capable of storing, encoding or carrying data structures used by or associated with such instructions. Non-limiting communication device-readable medium examples may include solid-state memories and optical and magnetic media. Specific examples of communication device-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, communication device-readable media may include non-transitory communication device-readable media. In some examples, communication device-readable media may include communication device-readable media that is not a transitory propagating signal.

The instructions 1024 may further be transmitted or received over a communications network 1026 using a transmission medium via the network interface device 1020 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, Licensed Assisted Access (LAA), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 1020 may include one or more physical jacks (e.g., Ethernet, coaxial, or phone jacks) or one or more antennas to connect to the communications network 1026. In an example, the network interface device 1020 may include a plurality of antennas to wirelessly communicate using at least one of single-input-multiple-output (SIMO), multiple-input-multiple-output (MIMO), or multiple-input-single-output (MISO) techniques. In some examples, the network interface device 1020 may wirelessly communicate using Multiple User MIMO techniques.

The term "transmission medium" shall be taken to include any intangible medium that is capable of storing, encoding or carrying instructions for execution by the machine 1000, and includes digital or analog communications signals or another intangible medium to facilitate communication of such software. In this regard, a transmission medium in the context of this disclosure is a device-readable medium.

It should be appreciated that where software is described in a particular form (such as a component or module) this is merely to aid understanding and is not intended to limit how software that implements those functions may be architected or structured. For example, modules are illustrated as separate modules but may be implemented as homogenous code, as individual components, some, but not all of these modules may be combined, or the functions may be implemented in software structured in any other convenient manner. Furthermore, although the software modules are illustrated as executing on one piece of hardware, the software may be distributed over multiple processors or in any other convenient manner.

Although embodiments have been described with reference to specific exemplary aspects, it will be evident that various modifications and changes may be made to these aspects without departing from the broader scope of the present disclosure. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects and other aspects not specifically described herein will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single aspect for the purpose of streamlining the disclosure. This method of disclosure is not to be interpreted as reflecting an intention that the claimed aspects require more features than are expressly recited in each claim. Rather, as the following claims reflect, the inventive subject matter lies in less than all features of a single disclosed aspect. Thus the following claims are hereby incorporated into the Detailed Description, with each claim standing on its own as a separate aspect.

What is claimed is:

1. A computer-implemented method, the method comprising:
    retrieving weather data from a weather radar;
    generating gridded data based on the weather data, the gridded data comprising a uniform grid of cubes, wherein each of the cubes is associated with at least one weather parameter value of a plurality of weather parameter values corresponding to the weather data;
    extracting a triangular mesh for a data grouping within the gridded data;
    generating an object file including vertices and faces associated with the triangular mesh;
    sending the object file to a three-dimensional (3D) visualization system to present a 3D rendering of the object file;
    generating a two-dimensional (2D) rendering of the weather data;
    receiving a selection of radar points within the 2D rendering using a geographical bounding box;
    storing the geographical bounding box as a bookmark; and
    transmitting the bookmark to the three-dimensional visualization system;
    wherein the bookmark comprises the weather data and a color map; and
    wherein the bookmark comprises index metadata in order to lookup the weather data and the color map.

2. The computer-implemented method of claim 1, further comprising:
    retrieving point data associated with the selection of radar points, the point data including latitude data, longitude data, height data, a color map, and weather parameter data.

3. The computer-implemented method of claim 2, wherein generating the gridded data further comprises:
    placing each radar point of the selection of radar points within an octree data structure to generate the uniform grid of cubes.

4. The computer-implemented method of claim 1, wherein each of the cubes includes a plurality of vertices, with at least one vertex of the plurality of vertices associated with a weather parameter value of the plurality of weather parameter values.

5. The computer-implemented method of claim 1, further comprising:
    applying a Marching Cubes algorithm to the gridded data to extract the triangular mesh.

6. The computer-implemented method of claim 1, further comprising:
    grouping portions of the gridded data to generate multiple data groupings, wherein the grouping is based on data ranges for the at least one weather parameter value for each of the cubes;
    generating a triangular mesh for each data grouping of the multiple data groupings; and
    generating the object file including vertices and faces associated with the triangular mesh for each data grouping of the multiple data groupings.

7. The computer-implemented method of claim 1, further comprising:
    applying a Phong lighting model to the 3D rendering of the object file, wherein the Phong lighting model includes one or more of the following:
    ambient lighting, diffuse lighting, and specular lighting.

8. The computer-implemented method of claim 1, wherein the object file is an OBJ format file.

9. The computer-implemented method of claim 1, wherein the 3D rendering is one of a 3D image rendering or a 3D point data rendering.

10. A computing device, the computing device comprising:
    a processor; and
    a memory, comprising instructions, which when executed by the processor, cause the processor to perform operations comprising:
    retrieving weather data from a weather radar;
    generating gridded data based on the weather data, the gridded data comprising a uniform grid of cubes, wherein each of the cubes is associated with at least one weather parameter value of a plurality of weather parameter values corresponding to the weather data;
    extracting a triangular mesh for a data grouping within the gridded data;
    generating an object file including vertices and faces associated with the triangular mesh;
    sending the object file to a three-dimensional (3D) visualization system to present a 3D rendering of the object file;
    generating a two-dimensional (2D) rendering of the weather data;
    receiving a selection of radar points within the 2D rendering using a geographical bounding box;
    storing the geographical bounding box as a bookmark; and
    transmitting the bookmark to the three-dimensional visualization system;
    wherein the bookmark comprises the weather data and a color map; and
    wherein the bookmark comprises index metadata in order to lookup the weather data and the color map.

11. The computing device of claim 10, wherein executing the instructions further cause the processor to perform operations comprising:
    placing each radar point of the selection of radar points within an octree data structure to generate the uniform grid of cubes.

12. The computing device of claim 10, wherein each of the cubes includes a plurality of vertices, with at least one vertex of the plurality of vertices associated with a weather parameter value of the plurality of weather parameter values.

13. The computing device of claim 10, wherein executing the instructions further cause the processor to perform operations comprising:

applying a Marching Cubes algorithm to the gridded data to extract the triangular mesh; and applying a Phong lighting model to the 3D rendering of the object file, wherein the Phong lighting model includes one or more of the following: ambient lighting, diffuse lighting, and specular lighting.

14. A non-transitory computer-readable storage medium that stores instructions for execution by one or more processors of a computing device, the instructions to configure the one or more processors to cause the computing device to:

retrieve weather data from a weather radar;

generate gridded data based on the weather data, the gridded data comprising a uniform grid of cubes, wherein each of the cubes is associated with at least one weather parameter value of a plurality of weather parameter values corresponding to the weather data, and wherein the gridded data is generated by a geohash at a constant height;

extract a triangular mesh for a data grouping within the gridded data;

generate an object file including vertices and faces associated with the triangular mesh; and send the object file to a three-dimensional (3D) visualization system to present a 3D rendering of the object file.

15. The non-transitory computer-readable storage medium of claim 14, wherein the instructions further configure the one or more processors to cause the computing device to:

generate a two-dimensional (2D) rendering of the weather data; and receive a selection of radar points within the 2D rendering using a geographical bounding box; and retrieve point data associated with the selection of radar points, the point data including latitude data, longitude data, height data, a color map, and weather parameter data.

16. The non-transitory computer-readable storage medium of claim 14, wherein the instructions further configure the one or more processors to cause the computing device to:

group portions of the gridded data to generate multiple data groupings, wherein the grouping is based on data ranges for the at least one weather parameter value for each of the cubes;

generate a triangular mesh for each data grouping of the multiple data groupings; and generate the object file including vertices and faces associated with the triangular mesh for each data grouping of the multiple data groupings.

17. The non-transitory computer-readable storage medium of claim 14, wherein the instructions further configure the one or more processors to cause the computing device to:

apply a Marching Cubes algorithm to the gridded data to extract the triangular mesh; and apply a Phong lighting model to the 3D rendering of the object file, wherein the Phong lighting model includes one or more of the following: ambient lighting, diffuse lighting, and specular lighting.

* * * * *